United States Patent
Grove-Rasmussen et al.

[11] Patent Number: 5,866,486
[45] Date of Patent: Feb. 2, 1999

[54] STONE WOOL

[75] Inventors: Svend Grove-Rasmussen; Lars Elmekilde Hansen, both of Roskilde, Denmark

[73] Assignee: Rockwool International A/S, Denmark

[21] Appl. No.: 567,218

[22] Filed: Dec. 5, 1995

Related U.S. Application Data

[63] Continuation of Ser. No. 90,026, filed as PCT/EP92/00087 Jan. 15, 1992 published as WO92/12941 Aug. 6, 1992, abandoned.

[30] Foreign Application Priority Data

Jan. 16, 1991 [GB] United Kingdom .................... 9100884

[51] Int. Cl.$^6$ .............................. D04H 1/08; D04H 1/58; D02G 3/00; C04B 14/46
[52] U.S. Cl. ........................... 442/60; 442/172; 442/327; 442/334; 442/340; 442/414; 442/417; 428/364; 428/401; 106/711
[58] Field of Search .................................. 428/268, 228, 428/364, 357, 288, 372, 378, 388, 401, 332, 289, 280, 323, 359, 331, 330, 329; 106/711; 65/455, 459, 469, 516, 529; 501/35, 36

[56] References Cited

U.S. PATENT DOCUMENTS

| | | | |
|---|---|---|---|
| 2,520,168 | 8/1950 | Powell | 18/2.6 |
| 2,520,169 | 8/1950 | Powell | 18/2.6 |
| 2,807,048 | 9/1957 | Hedges | 18/2.6 |
| 3,159,475 | 12/1964 | Chen et al. | 65/15 |
| 3,533,769 | 10/1970 | Baier et al. | 65/6 |
| 3,709,670 | 1/1973 | Eriksen | 65/8 |
| 3,883,334 | 5/1975 | Cassidy et al. | 65/2 |
| 4,026,478 | 5/1977 | Albert et al. | 241/24 |
| 4,119,421 | 10/1978 | Alenrot et al. | 65/14 |
| 4,124,730 | 11/1978 | Albert et al. | 427/220 |
| 4,177,168 | 12/1979 | Denny et al. | 252/470 |
| 4,238,213 | 12/1980 | Pallo et al. | 65/8 |
| 4,365,984 | 12/1982 | Gee | 65/2 |
| 4,448,921 | 5/1984 | Yamaya et al. | 524/443 |
| 4,504,544 | 3/1985 | Monaghan | 428/357 |
| 4,661,135 | 4/1987 | Mosnier | 65/14 |
| 5,131,935 | 7/1992 | Debouzie et al. | 65/6 |
| 5,250,153 | 10/1993 | Izard et al. | 162/152 |
| 5,468,274 | 11/1995 | Grove-Rasmussen | 65/469 |

FOREIGN PATENT DOCUMENTS

| | | |
|---|---|---|
| 2356606 | 1/1978 | France . |
| 961900 | 6/1964 | United Kingdom . |
| 999119 | 7/1965 | United Kingdom . |

*Primary Examiner*—Vivian Chen
*Attorney, Agent, or Firm*—Baker & Botts, L.L.P.

[57] ABSTRACT

The invention relates to stone wool formed from stone melt and consisting of 70 to 90% by weight stone wool fibers having diameters of up to 5 $\mu$m, 0 to 5% by weight stone wool fibers having diameters above 5 $\mu$m, and 10 to 25% by weight shot having a diameter of at least 63 $\mu$m, and in which the average diameter of the fibers is from 1 to 4 $\mu$m, the ratio of average fiber length:average diameter is 1,000 to 3,000, wherein the stone wool has a density from 12 to 85 kg/m$^3$ and thermal conductivity lambda values from 30 to 40 mW/m°K at 10° C.

17 Claims, 4 Drawing Sheets

STONE WOOL

This application is a continuation of application Ser. No. 08/090,026, filed as PCT/EP92/00087 Jan. 15, 1992, published as WO92/12941 Aug. 6, 1992 abandoned.

BACKGROUND OF INVENTION

Glass wool is well recognized as an efficient insulating material in that wool of low density gives good insulation, that is to say a low Lambda (thermal conductivity) value.

Stone wool is formed from molten mineral such as one or more of diabase, basalt, slag, limestone, dolomite, cement, clay, feldspar, sand or olivin and generally contains stone wool another good insulator, but stone wool needs to be of a higher density than glass wool to achieve a similar Lambda value. Thus more material is required. This is commercially satisfactory for most purposes because it is cheaper to make stone wool than glass wool and so the stone wool is competitive with, or economically preferred over, the corresponding glass wool despite the necessity to have a higher density. Stone wool is cheaper because it is made from cruder, iron-containing melts that are not suitable for glass wool, and glass wool requires purer melt including expensive additives such as soda and borate in the melt.

Stone wool also has some properties which glass wool does not have, i.e. higher temperature resistance and better water repellancy, and better sound absorption, because of the higher density. Consequently stone wool can be used in areas where glass wool is less efficient.

It would of course be highly desirable to be able to reduce the density of the stone wool without decreasing its performance, since the stone wool would then be even more cost effective or preferred over glass wool, for a given degree of thermal insulation. Unfortunately this has not proved possible.

Because of the wish to make stone wool in a cost-effective manner, for it to be competitive with glass wool, the emphasis has always been on maximizing the amount of wool that can be obtained in any particular wool-forming apparatus, and it has been accepted that the wool will inevitably contain coarse fibers and significant amounts, e.g., over 25% by weight, of shot having particle size above 63 $\mu$m.

The industry has accepted these restrictions as inevitable and has concentrated on ways of improving the productivity of processes for making such products.

In the following, the measurement of fibers diameter is referring to the standard accumulated length-based method carried out using a light microscope or a scanning electron microscope. The result on shot content is based on DIN standard No. 4188. The measurements on lambda are based on DIN No. 52612 part 1 and 2. Fiber length is based on 50% quantile on a logarithmic normal distributed graph. Density is calculated from measurement of volume according to DIN 18165 product type WL. The tensile strength measurements are referring to DIN No. 18165, measured on 30 kg/m³ cured product with a binder content of 1.4% by weight.

SUMMARY OF THE INVENTION

It would be very desirable to be able to provide stone wool that is formed from stone and that has a Lambda-density relationship much closer to glass wool than any known mineral wool formed from stone.

Stone wool formed from stone according to the invention consists of (based on the weight of inorganic components) 75 to 90% by weight stone wool fibers, 10 to 25% by weight shot having diameter of at least 63 $\mu$m, and the average diameter of the fibers in the wool is 1 to 4 82 m, preferably 1.0 to 3.5 $\mu$m, the ratio of average fibers length to average diameter is from 1000 to 3000, the density is from 12 to 100 kg/m³ and the thermal conductivity Lambda is from 30 to 40 mW/m°K at 10° C., and the relationship between density and Lambda is shown in the following table.

| Lambda MW/m °K. | Maximum Density kg/m³ | Minimum Density kg/m³ |
| --- | --- | --- |
| 40 | 16 | 12 |
| 38 | 18 | 13 |
| 36 | 22 | 15 |
| 35 | 24 | 18 |
| 34 | 29 | 20 |
| 33 | 33 | 23 |
| 32 | 40 | 28 |
| 31 | 55 | 38 |
| 30 | 85 | 50 |

Intermediate values can be obtained by interpolation.

Preferred products consist of (based on the inorganic content of the wool) from 75 to 88, often 77 to 83% by weight fibers having average diameter up to 3.5 $\mu$m, 0 to 6% fibers measured based on cumulative length based measurement having diameter above 5 $\mu$m, 10 to 25%, often 15 to 22% by weight shot having diameter above 63 $\mu$m (with the amount of shot above 250 $\mu$m generally being 0 to 2, often 0 to 1%) and with an average fiber diameter of from 2.5 to 3.5 $\mu$m and a ratio of average fiber length to average diameter typically of from 1,100 to 2,000, preferably 1,200 to 1,600.

The products can be free of bonding agent but preferably include bonding agent, such as a conventional resinous bonding agent eg a phenolic resin.

The products of the invention can also have excellent thermal conductivity values at a given density and the following table shows such values and also, for comparison, shows values for conventional glass wool and for typical high quality mineral wool made by known prior art processes:

| Lambda | Minimum Density kg/m³ | Maximum | Preferred Minimum | Example kg/m³ | Prior Stone Wool kg/m³ | Glass Wool kg/m³ |
| --- | --- | --- | --- | --- | --- | --- |
| 40 | 12 | 16 | 12 | 14 | 20 | 13 |
| 38 | 13 | 18 | 14 | 16 | 24 | 14 |
| 36 | 15 | 22 | 18 | 20 | 28 | 17 |
| 35 | 18 | 24 | 20 | 22 | 34 | 19 |
| 34 | 20 | 29 | 23 | 26 | 40 | 22 |
| 33 | 23 | 33 | 26 | 30 | 50 | 25 |
| 32 | 28 | 40 | 31 | 35 | 65 | 30 |
| 31 | 38 | 55 | 39 | 45 | — | 39 |
| 30 | 50 | 85 | 60 | 75 | — | 60 |

Intermediate values can be obtained by interpolation.

The figures in the above table show that the stone wool of the invention has much lower Lambda at a given density than stone wool made by known processes such as GB 1,559,117. In particular, it is possible to obtain lower Lambda values, for instance as low as 31 or even down to 30, in the invention whereas the lowest possible Lambda value in prior processes has generally been around 32. This means for example that the necessary density of the new wool to meet the important German lambda classification of 032 must be a mean density of 34 kg/m³, whereas normal mineral wool must have a density of 65 kg/m³. This means that 48% of the wool by weight and thereby the production cost is saved.

As the important part of a production line for mineral wool is limited by the capacity in tons wool per hour when producing this product, the above mentioned density reduction means a capacity increase of the production line of 91%, virtually without cost increase.

Other differences between the stone wool of the invention and stone wool made by processes such as GB 1,559,117 reside in the amount of shot above 63 μm, which typically was around 30% but is now around 20%, the amount of shot above 250 μm, which typically was 3 to 5% but is now around 1% or less. This reduction in the amount of coarse shot attained by the present invention has the advantages that it reduces the amount of waste of raw material during manufacture of the wool, and the wool itself has reduced harshness and more uniform properties than similar prior art wools.

The percentage of fibers in the wool having diameter above 5 μm which now is frequently 5% or less but in the old process typically was around 25%, and the ratio of average length to average diameter which is now above 1,200 but typically used to be up to around 800 or 900.

Although the products can have a tensile strength of 6 kN/m² preferably the products have a tensile strength of 10 to 20, often 12 to 16, kN/m².

DETAILED DESCRIPTION OF THE INVENTION

The stone that is used for forming the fibers in the invention can be any of the stone materials conventionally used for forming product that is known as stone wool, for instance rock, slag, diabase or basalt. Stone wool is characterised by a large variety of oxides, where the sum of $Al_2O_3$ and $SIO_2$ is generally between 40 and 70%, and the rest is other common oxides from minerals, for instance CaO, MgO, $Fe_2O_3$, FeO, $TiO_2$ or $Na_2O$, as described in U.S. Pat. No. 2,576,312 and in Danish patent application DK 4923/88 (publication number 159201B) and in particular generally contains iron and is generally free of expensive additives such as soda or borax, although minor amounts of these may be added if desired to modify the melt. It is clearly distinguished from material used for making ceramic fibers or glass fibers by the relationship between its melting point and viscosity and by its chemical composition, as is well known in the art. It should have a melting range throughout which fibers can be formed of above 80° C., often 100° to 200° C. and typically melts at above 1400° C. but below 1700° C.

In the invention, the amount of coarse fibers is substantially eliminated, the amount of shot is reduced and the ratio of average fiber length to diameter is greatly increased. As a consequence of these modifications, it is possible to achieve the density-Lambda relationship set out above.

The increase in the ratio of fiber length:diameter and the reduction in the amount of coarse fiber and shot cannot be achieved by conventional operation of any of the conventional processes of which we are aware for making stone wool such as those described in U.S. Pat. Nos. 3,709,670 or 4,119,421, GB 1,559,117, EPL 59152, or WO/90/15032. Instead, it is necessary to use a process that combines the features of several processes and to modify or optimize the combination. Preferably the process combines a wall jet effect of the type produced in GB 1,559,117 together with a greater than normal acceleration field on the rotors and a reduction in the throughput of melt or productivity of the process. Thus, a preferred way to make the novel products of the invention involves feeding much less melt on to the conventional fiberizing apparatus than has been conventional, for any particular density of end product.

A conventional process for forming known stone wool from molten stone uses fiberizing apparatus comprising a fiberizing chamber, fiberizing means in the chamber for receiving mineral melt, converting it into stone wool fibers and air supply means for blowing the fibers axially along the chamber, and collector means comprising a conveyor in the base of the chamber for collecting the blown fibers as a web and for carrying them away from the fiberizing means.

The fiberizing means comprises a set of rotors each mounted for rotation about a different substantially horizontal axis and arranged such that, when the rotors are rotating, melt poured onto the periphery of the top rotor in the set is thrown on to the periphery of the subsequent rotor (or onto the periphery of each subsequent rotor in sequence) in the set and mineral fibers are thrown off the or each subsequent rotor.

Typically the acceptable production of such a fiberizing apparatus is normally in the range 4 to 10 tons per hour but to make products of the invention it needs to be reduced generally to around 2 to 4, often 2 to 3, tons per hour and it is necessary to blast air as a wall jet along part or all the periphery of most or all of the rotor, preferably with both axial and tangential velocity components.

The overall apparatus in which the stone wool is made will comprise a fiberizing chamber, the fiberizing means for receiving stone melt and converting it into stone wool fibers, and air supply means for blowing the fibers axially along the chamber, and collector means comprising a conveyor in the base of the chamber for collecting the blown fibers as a web and for carrying them away from the fiberizing means. To make the wool of the invention, there are preferably at least two, for instance three to six fiberizing means in the chamber and each runs at the above-described relatively low throughput. By this means it is possible for the fiberizing chamber to produce an amount of wool that is reasonably conventional but a quality of wool that, in accordance with the invention, is far superior to any mineral wool produced previously from molten stone. Preferably there is a very high acceleration field on the fiber-forming rotors and preferably the air streams comprise wall jets on the fiber-forming rotors.

Suitable apparatus comprises a fiberizing chamber, at least two fiberizing means in side-by-side relationship in the chamber each constructed for receiving rock melt and converting it into rock wool fibers, air supply means for blowing the fibers axially along the chamber, and collector means comprising at least one conveyor in the base of the chamber for collecting the blown fibers and carrying them away from the fiberizing means as stone wool, and each fiberizing means comprises a set of at least three rotors each mounted for rotation about a different horizontal axis and arranged such that when the rotors are rotating melt poured on to the periphery of the top rotor in the set is thrown on to the periphery of each subsequent rotor in turn and fibers are thrown off the rotors, and the apparatus is characterised in that each of the said subsequent rotors in the set is provided with driving means and has a size such that it can rotate to give an acceleration field of above 250 km/s², all the rotors in the set have a diameter of below 250 mm, and the air supply means comprise an air supply slot associated with each of the said subsequent rotors wherein each slot has an internal diameter substantially the same as the external diameter of the periphery of its associated rotor and is constructed for discharging an air blast substantially parallel to that periphery. Preferably the air blast has both axial and tangential components of velocity.

The acceleration field is the centripetal acceleration and in this specification by referring to the acceleration field of a rotor we mean the value G where $G = r\Omega^2$ r is the radius of the respective rotor and $\Omega$ is the angular velocity of that rotor where $$\Omega = \frac{2\pi n}{60}$$

where n is the revolutions per minute.

The novel stone wool can be made using such apparatus wherein stone melt having a temperature of from 1300° to 1700° C., often 1400° to 1600° C., most preferably 1500° to 1550° C. is poured on to the top rotor in each set, each of the other rotors in each set provide the acceleration field of at least 250 km/s², and air is forced through each of the slots and along its associated rotor as a wall jet, often with both axial and tangential velocity components.

Preferably the amount of melt fed on to each of the fiberizing means is below 4 or 5 tons (often 2 to 3 tons) per hour but, since there are at least two fiberizing means in the fiberizing chamber, the production of the chamber generally is at least 8 tons and often at least 10 or even 12 tons per hour.

The excellent fiber quality obtainable by this process is thought to be due to a combination of the very high acceleration field, the provision of the wall jet over the surface that is subject to this very high acceleration field, and the ability to achieve good productivity at low throughput of each fiberizing means.

In U.S. Pat. Nos. 3,709,670 and 4,119,421 each set of rotors is a mirror image of the other, and this means that the operator will have to have two different sets of rotors in his plant and will have to maintain a stock of replacement parts for each type of rotor set. Preferably, in the invention, each set of rotors is identical in each of the fiberizing means and this has the advantage that it is only necessary to maintain a single set of replacement parts.

By saying that the sets of rotors are identical to one another we mean that they are interchangeable with one another without any adverse effect on the performance of the apparatus. Naturally there can be minor, and insignificant, differences between the sets. Often each entire fiberizing means is identical in this sense, so that a fiberizing means comprising the housing, the rotors and the air slots around the rotors, is interchangeable with another fiberizing means.

Preferably the largest rotors are much smaller than the largest rotors in conventional commercial apparatus, but the number of revolutions per minute, and therefore the peripheral velocity, are both greater than with conventional apparatus. As a result, the acceleration field is very much greater than with conventional apparatus. Thus, whereas prior to the invention the general trend was to increase the size of some or all of the fiberizing rotors, in the invention the largest rotors are smaller but faster than is conventional with the result that the acceleration force on them all is very much more than is conventional.

Whereas in conventional apparatus the highest acceleration field is generally less than 100 km/s² or at the most 140 km/s² (140,000 meters per second) on the largest rotor, with lower values on the preceding rotors, to make the novel products preferably all the rotors other than the top rotor in the set, have an acceleration field of above 250 km/s². Preferably the third, and the fourth rotor if present, have an acceleration field of above 300 km/s². The last rotor in the set can have an acceleration field above 300 km/s² and often above 350 km/s². Adequate results can be obtained with the final rotor, and often the second and third rotors, providing an acceleration field of not more than 400, 450 or 500 km/s², but very much higher acceleration fields can be provided and can result in improved product quality. For instance acceleration fields of up to 750 km/s² or even up to 1000 km/s² can give very good products but it is then generally necessary for the rotor diameters to be at the bottom end of the ranges quoted below, for instance 130 to 170 mm.

The rotors for these very high speeds can be made from steel conventionally used for fiberizing rotors because they can all be of low diameter. The rotors can be mounted in special bearings for high revolutions, for instance tilting-pad slide bearings (for example make Glacier), magnetic bearings (for instance make S2M) or an angular contact ball bearing mounted with oil film damping (for instance make SKF or FAG).

Generally they all have diameter below 220 mm but usually above 100 mm, often above 130 mm. Often the top rotor is from 100 to 180 mm while the others are usually larger than the top rotor and in the range 140 to 210 mm.

Whereas previously it has been conventional for each rotor to be larger than the preceding one, in the invention it is convenient for all the rotors other than the top rotor to be of substantially the same size.

The rotors generally all rotate at 10,000 to 40,000 rpm. The second, third and, if present, fourth rotors generally rotate at from 14,000 to 35,000, often 15,000 to 30,000, rpm while the top rotor generally rotates at from 10 to 20,000 rpm, often 12,000 to 15,000 rpm.

The acceleration field of the top rotor is preferably at least 50 km/s² and often is at least 100 km/s² but it is generally unnecessary for it to be above 200 km/s², with values of around 120 to 160 km/s² often being preferred. This is very much greater than in existing apparatus, where the value typically does not exceed 15 km/s² on the top rotor.

The ratio of the peripheral velocity of one rotor to the velocity of the preceding rotor is generally from 1:1 to 1.5:1, preferably around 1.1:1 to 1.3:1.

There is an air supply slot associated with each fiberizing rotor close to that rotor for discharging an air blast close to and substantially parallel to the periphery of the rotor with an axial component for carrying the mineral wool fibers axially off that periphery. When the air is to have a tangential component of velocity preferably there are direction means for selecting the angle of the discharged air relative to the axial direction. The direction means can be arranged to direct the air at an angle that varies along the length of the slot between the higher angle that is co-rotational with the slot and a lower angle.

As a result of having these direction means directing the air at different angles within the same set, it is now possible to optimize the air flow at each part of each set. As a consequence of this, it is for the first time possible to optimize the air flows in one set in relation to the air flows in the adjacent set, and thus it is possible to obtain very good fiberizing results even though the sets of rotors can be very close to one another and can be identical to one another.

Preferably the internal diameter of the slot is the same as the external diameter of the periphery of the associated rotor and the slot is constructed to direct the air blast parallel to the surface of that rotor, since this will then lead to the formation of a wall jet. However the internal diameter of the slot can be a few millimeters more than the diameter of the periphery of the rotor and/or the angle of the air blast can be at a small conical angle with respect to the periphery of the rotor provided the difference in diameter and/or the angle are such that a wall jet is still formed. Whether or not this is occurring can easily be established by identifying the velocity profile adjacent to the surface. When a wall jet exists, the greatest velocity is close (e.g., within 10 mm) to the surface both at the rear edge of the rotor and at the front edge of the rotor.

In the preferred apparatus there should be an air slot associated with each of the second, third and, if present, fourth rotors in each of the fiberizing means, but is less important whether or not there is an air slot associated with the top rotor in each fiberizing means.

Generally each slot extends around at least ⅓ of the periphery of its associated rotor, generally around the outer part distant from the other rotors in the set. Generally it extends around not more than ⅔ or ¾ of the periphery.

Each slot generally leads from an air supply chamber within a housing on which the rotors are mounted.

The direction of air from each slot can be wholly axial but it is often desirable for it to have a corotational tangential component at least in some parts of the slot. For instance the tangential velocity can be up to 30% or even up to 50% or more of the peripheral velocity of the rotor. Typically the tangential component of the air stream has a velocity of from 80 to 100 meters per second, but values down to 50 meters per second or less can be useful. The linear velocity of the air stream generally is in the range 100 to 300 meters per second, often 100 to 200 m/s.

The air slot can consist of inner and outer slots, wherein the inner slot provides an inner blast of air that is sufficiently close to the surface to form a wall jet and the outer slot provides an outer blast of air that merges with the inner blast so as to give a wall jet effect to the combined blasts. Generally the inner surface of the outer slot is not more than 20 or 30 mm radially from the surface of the rotor and generally it is within 10 mm. Preferably the inner and outer blasts have different angles of travel at the time of exiting from their slots. For instance the inner bast can be wholly axial and the outer slot can contain the direction means to cause the outer blast to have the desired tangential component.

For optimum results it is important to control the relative positions of the axes of the various rotors and, especially, the relative positions of the axes of the first and second rotors. Preferably the second rotor is slightly below the first rotor such that a line joining the two axes is at an angle of 0 to 20, often 5 to 10, degrees to the horizontal. Generally the melt is fed on to the rotor at a position such that a line from that point of contact to the axis of the first rotor makes an angle of from 40 to 65, generally 45 to 60, degrees to that horizontal. As a result, the rotational distance from the point where the melt contacts the first rotor to the line joining the axes of the first and second rotors is generally in the range 45° to 80° preferably 50° to 70°. Preferably each fiberizing means consists of four rotors and preferably each fiberizing chamber contains at least three, often up to six, sets of fiberizing means. Each fiberizing means generally has associated with it means for spraying binder into the fibers that are being collected. Suitable binder sprays can be mounted on the rotors and/or elsewhere around the fiberizing means, in known manner. Secondary air supplies may be provided around the fiberizing means to promote collection of the fibers.

BRIEF DESCRIPTION OF DRAWINGS

Apparatus suitable for making products of the invention is illustrated by reference to the accompanying drawings in which.

Figure 1:
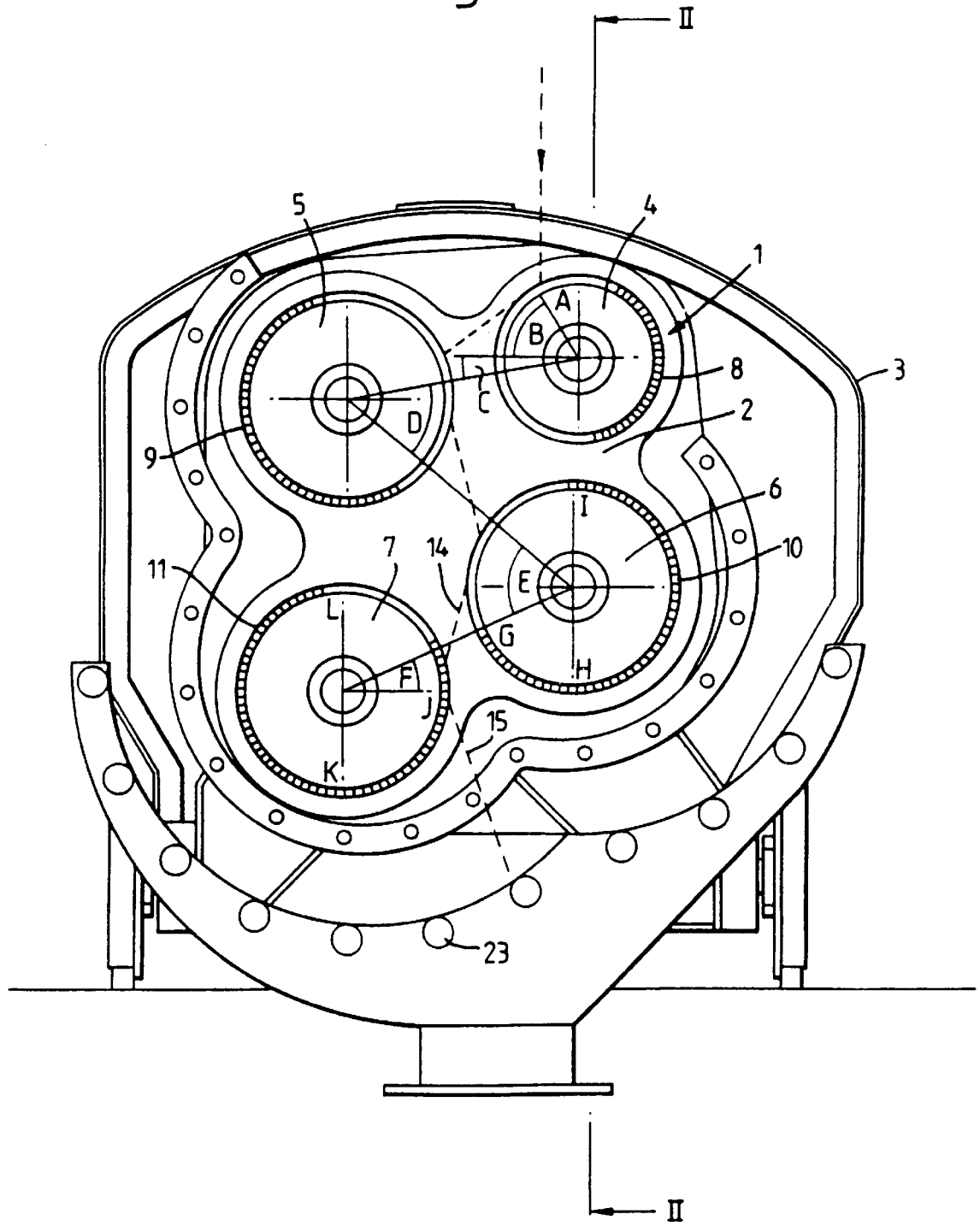
FIG. 1 is a front view of a set of rotors assembled at one end of a fiberizing chamber for use in apparatus suitable for making products according to the invention.

The apparatus includes three sets 1 of rotors each mounted on the front face 2 of a housing 3. They are positioned at one end of a chamber to receive melt from channels 35 that lead from a melt furnace. Each rotor is mounted in conventional manner on a driven axle that allows it to be rotated at high peripheral speed. The set consists of four rotors, a top rotor 4 that rotates anti-clockwise, a second fiberizing rotor 5 that rotates clockwise, a third fiberizing rotor 6 that rotates anti-clockwise, and a fourth fiberizing rotor 7 that rotates clockwise. The bearings and drive mechanisms are not shown. Air slots 8, 9, 10 and 11 are associated with, respectively, the rotors 4, 5, 6 and 7, each slot extending around part only of the rotor.

Molten mineral melt is poured on to the rotor 4 along the path that terminates at point A that preferably makes an angle B with the horizontal from 40° to 65°, preferably 45° to 60°.

The second fiberizing rotor 5 should be positioned at or only slightly below the first rotor and so the angle C typically is from 0° to 20°, often around 5° to 10°.

By this means, it is possible to ensure that melt that is thrown off the first rotor on to the second rotor impacts on the peripheral surface of the second rotor substantially at right angles (e.g., from 75° to 105° to the normal). Similarly, it is preferred that the sum of angles D, E and F should be as low as possible. F is the included angle between the horizontal and the line joining the axes of the third and fourth rotors, E is the included angle between the lines joining the axes of the third and fourth rotors and the second and third rotors, while D is the included angle between lines joining the axes of the first and second rotors with the axes of the second and third rotors. Preferably C+D+E+F is below 150° but should generally be above 120°, and most preferably it is in the range 125° to 142°, with best results being obtained at around 135° to 140°.

Some of the melt striking the top rotor 4 at A may be thrown off the rotor 4 as fibers but most or all is thrown on to subsequent rotor 5. Some of the melt is fiberized off that rotor whilst the remainder is thrown along path 13 on to subsequent rotor 6. A significant amount of this is fiberized off rotor 6, mainly in the area where there is slot 9, but some is thrown along path 14 on to the subsequent rotor 7. A significant amount is fiberized in the general direction 15 but a large amount is also fiberized around the remainder of the rotor surface included within slot 10.

Since the slots 8, 9, 10 and 11 do not extend around the entire periphery of each rotor, the air flow in the region of paths 12, 13 and 14 can be controlled and, indeed, can be substantially zero.

The top, or first, rotor may have a size of about 150 mm and preferably each of the other rotors has a size of around 200, and thus the ratio of the last to first is around 1.2:1 to 1.5:1, preferably around 1.33:1.

The speed of rotation of the rotors is, preferably, around 13,000, 15,000, 17,000 and 19,000 rpm respectively and thus the ratio of the speed of the last rotor to the first rotor is typically around 1.2 to 1.7, preferably around 1.5:1.

The acceleration force on the top rotor is then around 140,000 m/s$^2$ and on the other rotors is, respectively, around 245,000, 312,000 and 390,000 m/s$^2$ respectively.

The rate of supply of melt onto each top rotor is generally in the range 2 to 3 tons/hour and so typically the entire apparatus runs at 7.5 to 12.5 tons/hour.

The air emerging through the slots preferably has a linear velocity of 100 to 200 m/s. This air flow may have both axial and tangential components, or solely axial.

In order to control the angle of air flow, within each slot blades 25 can be mounted at an angle, relative to the axial direction of the associated rotor, that can be predetermined at a value ranging, typically, from zero to 50°. For instance, in slot 10 the angle in the region G to H can increase from 0° at G to about 20° at H and then the angle of the blades in the region H to I can be substantially uniform at 45°. Similarly, in slot 10 the angle can increase from about zero at J up to about 20° at K and can then increase and be substantially uniform throughout the region K to L at an angle of about 45°.

In slot 8, it may be preferred to have a lesser angle, typically a uniform angle of around 15° to 30°, often around 20° or 25°.

Although it is convenient to supply the air through the slots, a similar effect can be achieved by other means of providing a continuous curtain of air over the rotor surface, for instance a series of adjacent blast nozzles arranged around the rotor in the position shown in the drawings for the slots and that will lead to the formation of a wall jet.

The inner edge 24 of each slot is preferably coaxial with the associated rotor and preferably has a diameter that is substantially the same as the associated rotor.

Binder sprays 18 can be mounted as a central nozzle on the front face of each rotor and eject binder into the fibers that are blown off the rotor. Instead of or in addition to this, separate binder sprays may be provided, for instance beneath or above the set of rotors and directed substantially axially.

The fiberizing chamber comprises a pit 20 having a double screw 21 that collects pearls and other fiber that drops into the pit and recycles them to the furnace. A conveyor 22 collects the fibers and carries them away from the spinners. Air is forced through a secondary air ring, for instance a plurality of orifices 23 arranged around the front face of the housing 2 and/or in and/or beneath the front face of the housing 2. The secondary air ring provides an air stream to promote the axial transport of the fibers away from the rotors and to control their rate of settlement and the intermixing with binder.

Figure 3:
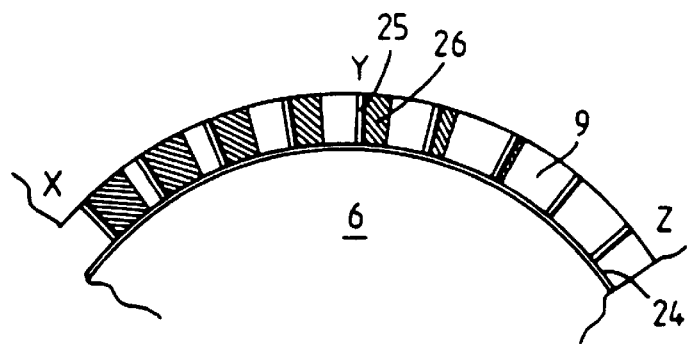
FIG. 3 is a detail of the slot around one of the rotors.

It will be seen from FIG. 3 that the inner edge 24 of the annular slot has substantially the same diameter as the outer edge of the periphery of rotor 6 and that the blades 25 are arranged substantially radially across the slot. Of course, if desired, they may be arranged at an angle. The leading edge of the blades is shown as 25, and the side face the blades is shown as 26. In FIG. 3, position X corresponds approximately to position I in FIG. 1, i.e., where the blades are arranged at about 42°, position Y corresponds to position H, i.e., where the blades are arranged at around 20°, and position G corresponds to position Z, i.e., where the blades are at 0° and thus promote truly axial flow of the air.

Figure 2:
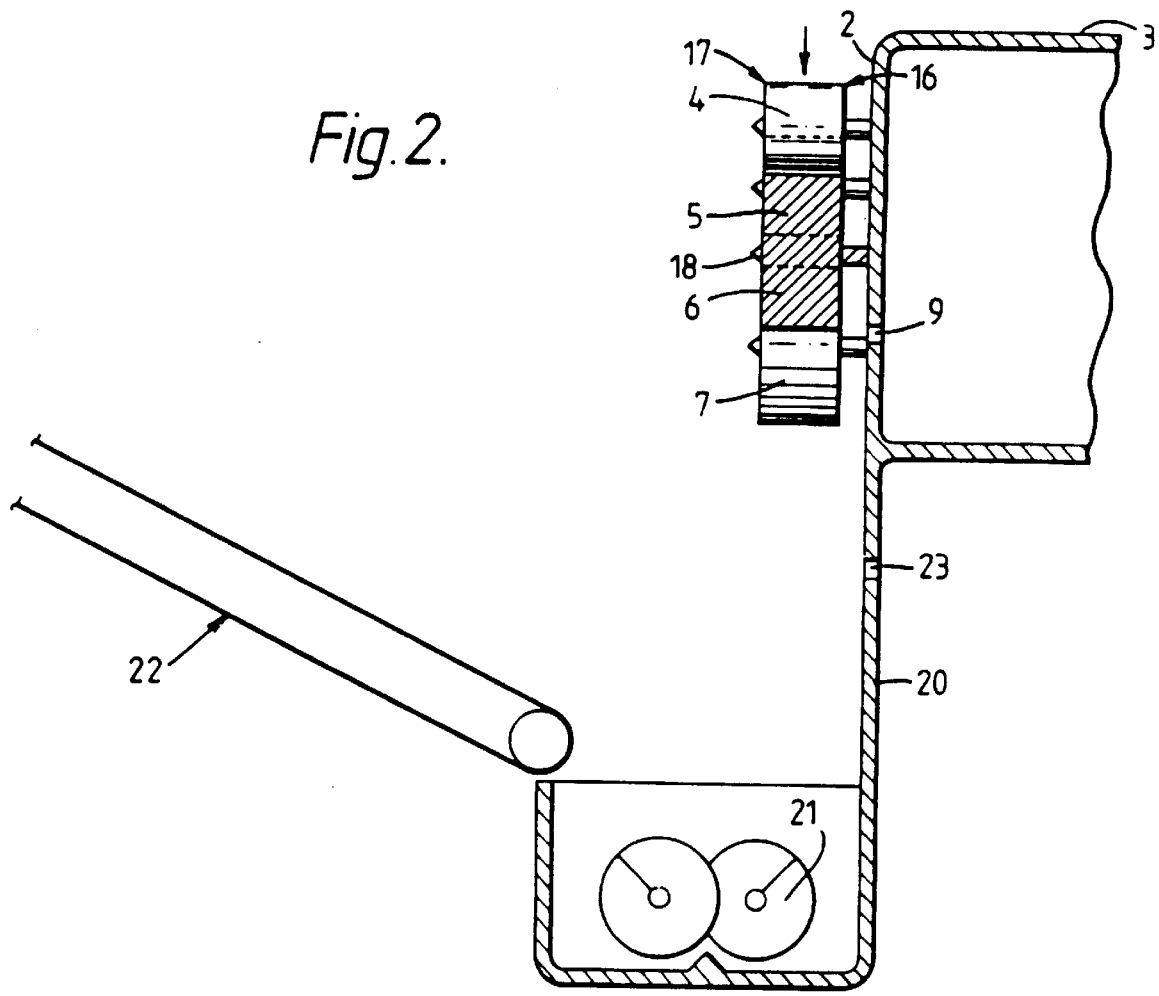
FIG. 2 is a cross-section on the line II—II through a set of rotors in FIG. 1 and through the collecting chamber in which they are positioned in use.

Although only a single air inlet 23 is illustrated in FIGS. 1 and 2, preferably there are a plurality of individually mounted air slots that are mounted beneath the rotors and that direct air in a generally forward direction. Some or all of them are pivotally mounted so that they can be relatively horizontal or relatively vertical or otherwise inclined. Also they can have blades that control the direction of air from the slot. Also, the blades can be mounted for reciprocating motion in order that they can be reciprocated during use so as to provide a pulsating air stream. Generally the slots point upwards so as to direct air upwardly and forwardly. By appropriate choice of air streams, and their movement if any, it is possible to optimize fiber collection, binder distribution, and the properties of the final product.

In an example, the spinning chamber is provided broadly as shown in the drawings but with three substantially identical fiberizing means each having a set of four rotors. The first rotor has a diameter of 150 mm while the other three all have diameters of 200 mm. The rotors rotate at, respectively, 13,000, 15,000, 17,000 and 19,000 rpm. This gives acceleration fields of 139 km/s$^2$, 246 km/s$^2$, 312 km/s$^2$ and 391 km/s$^2$ respectively. The inner periphery of each of the slots 9, 10 and 11 has a radius identical to the radius of the periphery of the associated rotor. Air is forced out of the slots at a linear speed of 120 m/s. The blades are arranged at different angles within the slots, as described above, so that the air flow is substantially axial where the rotors are close to one another and is split into approximately equal axial and tangential components at the outermost positions on the rotors.

Mineral melt of the following composition: 49% $SiO_2$, 13% $Al_2O_3$, 2.1% $TiO$, 5.3% FeO, 14.2% CaO, 9.7% MgO, 2.6% $Na_2O$, 1.1% $K_2O$ is poured on to each top rotor at a position A that makes an angle B of 60° C. with the horizontal. Angles C, D, E and F are, respectively, 10°, 48°, 63° and 24°. The temperature of the melt when it flows down to the top rotor is 1500°.

Figure 4:
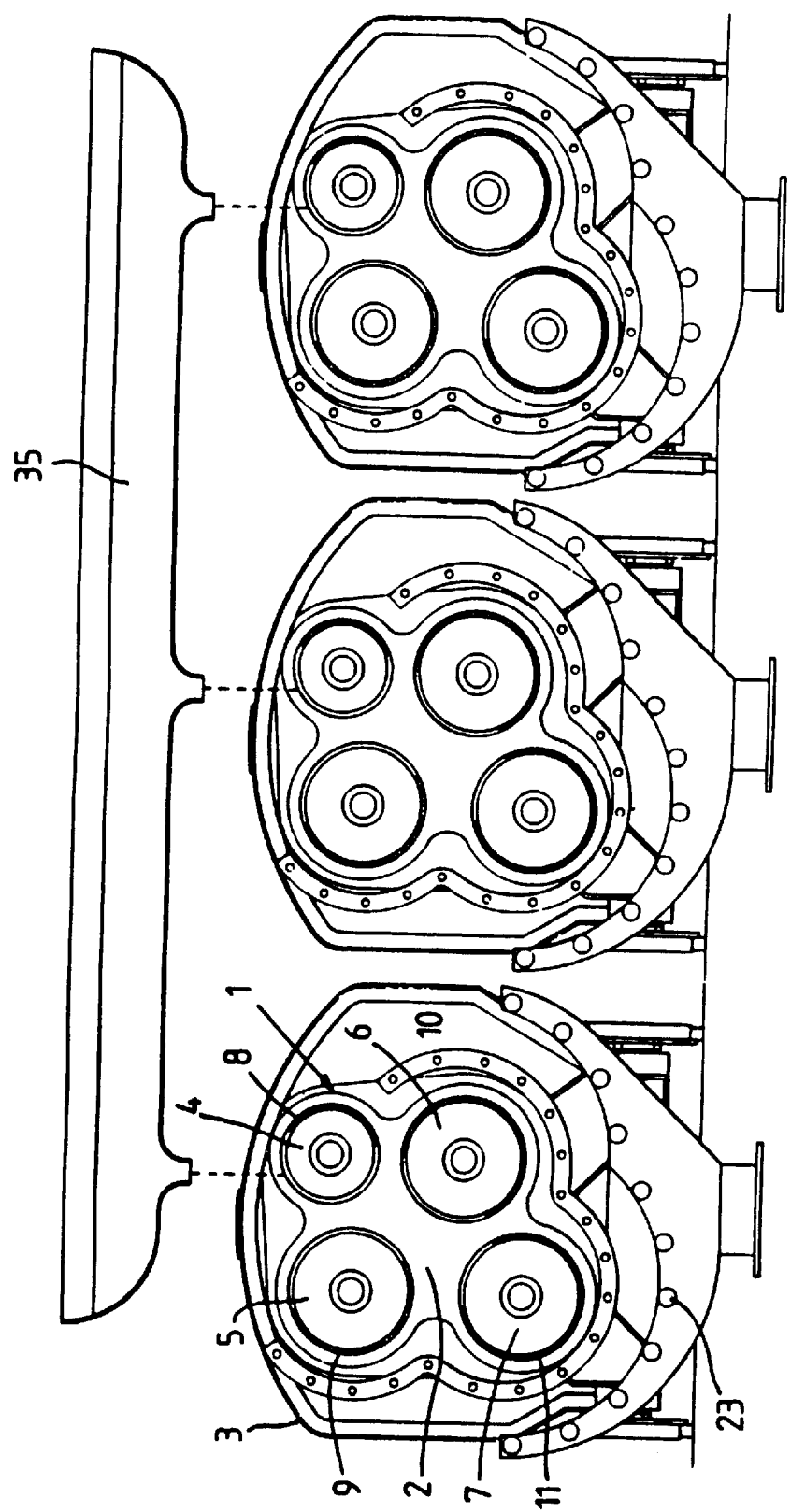
FIG. 4 is a front view of three of the sets of rotors arranged at one end of the chamber.

Around each fiberizing means 5000 m$^3$/h primary air is blown through the slots 9, 10 and 11 and 5000 m$^3$/h secondary air is blown through the slots 23 through reciprocating outlets 30, 31 and 32 as shown in FIG. 4 and binder is sprayed both coaxially as shown in FIG. 2 and from binder sprays arranged around the fiberizing means. The rate of feed of melt on to each top rotor is about 2.5 tons per hour giving a total feed to the chamber of 7.5 tons per hour. A small amount of this is recovered as shot from the pit 21 but the great majority is recovered as the bonded stone wool batts.

The fibers are collected on conveyor 22 and compressed to various densities. The density and the associated Lambda value are shown in the table above in the column head "Example". Thus the batt having Lambda 36 has a density of 20 kg/m$^3$ while the batt having Lambda 34 has density 27 kg/m$^3$.

Figure 5:
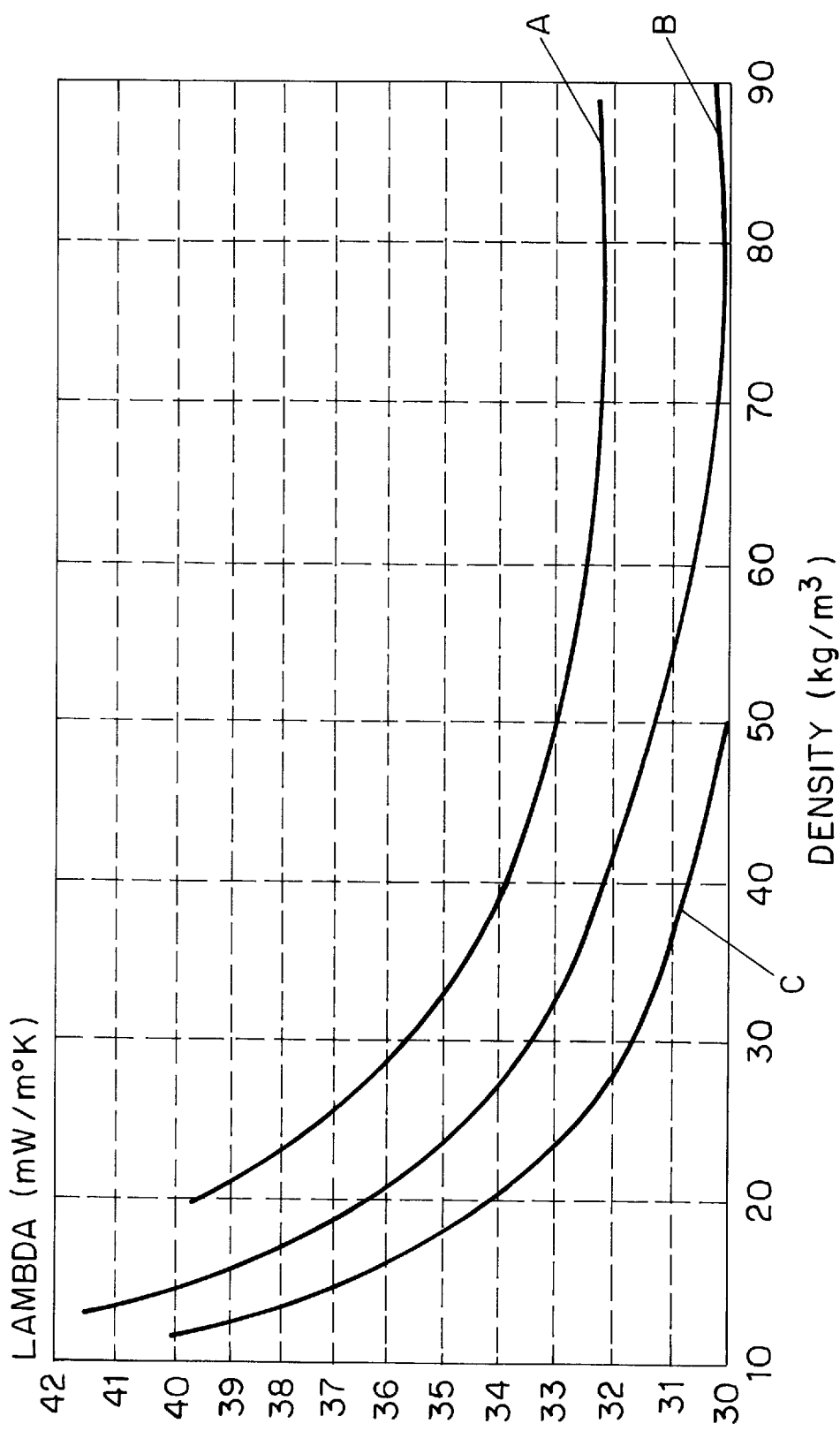
FIG. 5 is a graph of Lambda against density for a standard mineral wool and that obtained in the present invention.

Analysis of the batt shows that it consists of (based on inorganic material) about 80% by weight fibers and total shot above 63 µm about 20% of which about 0.7% is above 250 µm. Average fiber diameter is about 2 µm and average fiber length is about 3 giving a ratio of length:diameter of about 1500. Tensile strength is 14 kN/m$^2$ In FIG. 5 the upper curve A represents a standard mineral wool made by a process such as described in GB 1,559,117; the middle curve B represents the stone wool of the invention depicting the maximum density values as shown in the above table; and the lower curve C represents the stone wool of the invention depicting the minimum density values as shown in the table. It will be understood by one skilled in the art that the stone wools according to the invention have density and lambda values which fit in the area defined by curves B and C.

The graph illustrates that with the process of the invention it is possible to achieve equivalent Lambda values to a standard mineral wool but at a lower density ie. using a lower amount of mineral wool, and thereby reducing production costs.

Also, the lower curve approaches, and is often close to, the curve obtained with glass wool. Accordingly it is possible for the first time to obtain conductivity properties in the invention using stone wool that approach those of glass wool despite the much cheaper manufacutring and material costs.

We claim:

1. Stone wool formed from stone melt and consisting of 75 to 90% by weight stone wool fibers and 10 to 25% by weight shot having diameters of at least 63 $\mu$m, and in which the average diameter of the fibers is from 1 to 4 $\mu$m, the ratio of average fiber length:average diameter is 1,000 to 3,000, wherein the density of the stone wool is from 12 to 85 kg/m$^3$ and wherein the thermal conductivity Lambda of the stone wool is from 30 to 40 mW/m°K at 10° C. and wherein the stone wool must have a relationship between density and Lambda as set out in the following table:

| Lambda | Maximum Density | Minimum Density |
| --- | --- | --- |
| 40 | 16 | 12 |
| 38 | 18 | 13 |
| 36 | 22 | 15 |
| 35 | 24 | 18 |
| 34 | 29 | 20 |
| 33 | 33 | 23 |
| 32 | 40 | 28 |
| 31 | 55 | 38 |
| 30 | 85 | 50, | intermediate values being obtainable by interpolation.

2. Stone wool according to claim 1 in which the amount of fibers having diameters of up to 3.5 $\mu$m is 75 to 88%.

3. Stone wool according to claim 2 in which the amount of fibers having diameters of up to 3.5 $\mu$m is 77 to 83%.

4. Stone wool according to claim 3 in which the amount of shot having diameters of at least 63 $\mu$m is from 15 to 22%.

5. Stone wool according to claim 2 in which the amount of shot having diameters of at least 63 $\mu$m is from 15 to 22%.

6. Stone wool according to any one of claims 2 or 3 in which the amount of fibers having diameters above 5 $\mu$m is 0 to 6% based on cumulative length based measurement.

7. Stone wool according to claim 6 in which the amount of shot having diameters of at least 63 $\mu$m is from 15 to 22%.

8. Stone wool according to claim 1 in which the amount of shot having diameters of at least 63 $\mu$m is from 15 to 22%.

9. Stone wool according to claim 1 in which the amount of shot having diameters greater than 250 $\mu$m is 0 to 2%.

10. Stone wool according to claim 1 in which the amount of shot having diameters greater than 250 $\mu$m is 0 to 1%.

11. Stone wool according to claim 1 in which the average diameter of the fibers is from 2.0 to 3.5 $\mu$m.

12. Stone wool according to claim 1 in which the ratio of average fiber length to average diameter is from 1,100 to 2,000.

13. Stone wool according to claim 12 in which the ratio of average fiber length to average diameter is from 1,200 to 1,600.

14. Stone wool according to claim 1 wherein the fibers have a tensile strength of from 6 to 14 kN/m$^2$.

15. Stone wool according to claim 1 in which the stone is selected from the group consisting of rock, slag, diabase and basalt.

16. Stone wool according to claim 1 further containing a bonding agent.

17. Stone wool according to claim 16, wherein said stone wool is formed into bonded stone wool batts.

* * * * *